US011442011B2

(12) United States Patent
Kim et al.

(10) Patent No.: US 11,442,011 B2
(45) Date of Patent: Sep. 13, 2022

(54) FLUORESCENT STANDARD STRIP

(71) Applicant: SUGENTECH, INC., Daejeon (KR)

(72) Inventors: Sungrak Kim, Daejeon (KR); Huije Lee, Daejeon (KR); Hosung Sohn, Daejeon (KR); Seungbum Yoo, Daejeon (KR); Mi-Jin Sohn, Daejeon (KR)

(73) Assignee: SUGENTECH, INC., Daejeon (KR)

(*) Notice: Subject to any disclaimer, the term of this patent is extended or adjusted under 35 U.S.C. 154(b) by 0 days.

(21) Appl. No.: 17/259,232

(22) PCT Filed: Jul. 10, 2019

(86) PCT No.: PCT/KR2019/008507
§ 371 (c)(1),
(2) Date: Mar. 31, 2021

(87) PCT Pub. No.: WO2020/013611
PCT Pub. Date: Jan. 16, 2020

(65) Prior Publication Data
US 2021/0270737 A1 Sep. 2, 2021

(30) Foreign Application Priority Data

Jul. 11, 2018 (KR) .................. 10-2018-0080510

(51) Int. Cl.
*G01J 3/44* (2006.01)
*G01N 21/64* (2006.01)

(52) U.S. Cl.
CPC ............ *G01N 21/64* (2013.01); *G01J 3/4406* (2013.01)

(58) Field of Classification Search
CPC ................. G01N 21/64; G01N 21/278; G01N 2021/6417; G01J 3/02; G01J 3/00; G01J 3/4406; G01J 2003/468
See application file for complete search history.

(56) References Cited

U.S. PATENT DOCUMENTS

2003/0157726 A1 8/2003 Blum et al.

FOREIGN PATENT DOCUMENTS

| EP | 1775746 A1 * | 4/2007 | ............ H01J 29/085 |
| JP | 2002-214243 A | 7/2002 | |

(Continued)

OTHER PUBLICATIONS

International Searching Authority, International Search Report of PCT/KR2019/008507 dated Oct. 18, 2019 [PCT/ISA/210].

*Primary Examiner* — Abdullahi Nur
(74) *Attorney, Agent, or Firm* — Sughrue Mion, PLLC

(57) ABSTRACT

A fluorescent standard strip, according to the present invention, is for testing the reliability of the fluorescence intensity of a fluorescent strip used for an analyzer, the fluorescent standard strip having an effect whereby, for devices using a fluorescent substance, the inter-device deviation in fluorescence intensity is reduced, fluorescent signal linearity per fluorescent concentration level is secured, and device reliability may be tested by periodically checking faults, errors, deviations, etc. of the devices. In addition, the fluorescent standard strip, according to the present invention, has an effect whereby, even in an environment and state where light is frequently irradiated, the reduction of fluorescence intensity according to time may be minimized, i.e., the same level of fluorescence intensity may be maintained for a long period.

9 Claims, 6 Drawing Sheets

(56) References Cited

FOREIGN PATENT DOCUMENTS

| JP | 2007-064657 A | 3/2007 |
| JP | 2011-038922 A | 2/2011 |
| KR | 10-0639776 B1 | 10/2006 |
| WO | 2012/124508 A1 | 9/2012 |

* cited by examiner

FLUORESCENT STANDARD STRIP

TECHNICAL FIELD

The present invention relates to an apparatus for detecting an intensity of fluorescence from a fluorescent strip used for an analysis device.

BACKGROUND ART

In the conventional medical field such as bio-diagnosis, a fluorescent substance is used in an analysis device using a fluorescence analysis method such as a lateral flow strip or a microfluidic chip.

In the manufacture of analysis devices using the fluorescent substance, there has been a problem in that, even though the configuration of hardware installed is designed identically between the devices, the final devices manufactured fail to obtain the same data for the same fluorescent signal, due to a lot of variables such as a deviation in electromagnetic characteristics of components and a deviation in combination between individual components. Accordingly, when a required substance is quantitatively diagnosed and analyzed by measuring an intensity of fluorescence, there has been a problem in that the reliability of the result is significantly lowered.

This means that, in the manufacture of the analysis devices using the fluorescent substance, it is difficult for multiple fluorescence analysis devices to implement the same performance. Thus, when manufacturing multiple analysis devices, it is necessary to adjust a deviation in intensity of fluorescence between the devices by using a fluorescent standard strip, based on which the devices can have a required intensity of fluorescence. However, in the fluorescent substance used in the conventional medical field such as bio-diagnosis, fluorescent quenching occurs, while consuming energy by emitting fluorescence from the fluorescent substance at a specific wavelength, when the fluorescent substance is irradiated with a light source periodically or aperiodically. When the standard strip is manufactured using such a fluorescent substance with severe fluorescence quenching, the standard strip is not suitable for the purpose of use because measurements repeated about several to tens of times are required to reduce the deviation between the devices.

Therefore, there has been a need for a solution for checking and testing a signal for its linear characteristic to obtain a signal value relative to a fluorescent concentration level from the device using the fluorescence analysis method.

RELATED ART DOCUMENT

Patent Document (Patent Document 1) KR0639776B1 (Oct. 23, 2006)

DISCLOSURE

Technical Problem

An object of the present invention is to provide a fluorescent standard strip capable of reducing an inter-device deviation in intensity of fluorescence for a device using a fluorescent substance, securing a linear fluorescent signal characteristic for each fluorescent concentration level, and testing the device for reliability by periodically checking the device for faults, errors, deviations, or the like.

A specific object of the present invention is to provide a fluorescent standard strip capable of minimizing a decrease in intensity of fluorescence over time, that is, maintaining the same intensity of fluorescence for a long period of time, even in environments and conditions where light irradiation is frequent.

Another object of the present invention is to provide a fluorescent standard strip making it easy to manufacture fluorescent standard strips having a required intensity of fluorescence.

Technical Solution

In one general aspect, a fluorescent standard strip for testing a fluorescent strip used for an analysis device for reliability as to intensity of fluorescence includes: a substrate; a fluorescent layer stacked on the substrate and including a fluorescent substance; and a masking layer stacked on the fluorescent layer to partially block fluorescence exposed to the outside from the fluorescent layer. In this case, an intensity of fluorescence for the fluorescent substance of the fluorescent standard strip may be higher than that for a fluorescent substance of the fluorescent strip to be tested.

In an exemplary embodiment of the present invention, the fluorescent substance of the fluorescent standard strip may have an emission wavelength falling within an emission wavelength range of the fluorescent substance used in the analysis device.

In an exemplary embodiment of the present invention, the fluorescent strip to be tested may be tested for reliability as to intensity of fluorescence exposed to the outside therefrom, based on an intensity of the fluorescence exposed to the outside from the fluorescent standard strip.

In an exemplary embodiment of the present invention, the masking layer may include: a light transmitting portion having a pattern formed to control a transmission of the fluorescence incident from the fluorescent layer to the masking layer, while allowing the fluorescence to be transmitted therethrough; and a light blocking portion blocking the fluorescence, and one or more light transmitting portions may be formed, with the light blocking portion being a boundary therebetween.

In an exemplary embodiment of the present invention, the light transmitting portion may include a plurality of microstructures spaced apart from each other to form the pattern, such that the transmission of the fluorescence incident from the fluorescent layer is reduced.

In an exemplary embodiment of the present invention, the light transmitting portion may include a line pattern in which a plurality of lines continuing from one side to the other side of the masking layer are spaced apart from each other, and the microstructures may be located between the lines and the fluorescent layer, such that the transmittance of the fluorescence incident from the fluorescent layer to the light transmitting portion is reduced.

In another general aspect, a fluorescent analysis device set includes: the above-described fluorescent standard strip; and a fluorescent analysis device.

In another general aspect, a method of testing a fluorescent strip for reliability using a fluorescent standard strip includes: a) applying the above-described fluorescent standard strip to the analysis device and measuring a fluorescence detection value; and b) determining whether the fluorescence detection value falls within a required standard value range of the analysis device.

In an exemplary embodiment of the present invention, the method may further include c) comparing the fluorescence detection value and the required standard value of the analysis device for calculation and correcting an error for a deviation value of the analysis device.

Advantageous Effects

The fluorescent standard strip according to the present invention is advantageous in that an inter-device deviation in intensity of fluorescence can be reduced for the device using the fluorescent substance, a linear fluorescent signal characteristic for each fluorescent concentration level can be secured, and the device can be tested for reliability by periodically checking the device for faults, errors, deviations, or the like.

In addition, the fluorescent standard strip according to the present invention is advantageous in that, even in environments and conditions where light irradiation is frequent, a decrease in intensity of fluorescence over time can be minimized, that is, the same intensity of fluorescence can be maintained for a long period of time.

Even if the effects are not explicitly mentioned in the present invention, the effects described in the specification anticipated by the technical features of the present invention and the inherent effects thereof are treated as described in the specification of the present invention.

DESCRIPTION OF DRAWINGS

The left image of FIG. 1 is a conceptual diagram concerning emission of fluorescence from a fluorescent standard strip according to the present invention when irradiated with a light source, and the right image of FIG. 1 is a graph for comparing an intensity of fluorescence from a fluorescent substance of the fluorescent standard strip, an intensity of fluorescence from a fluorescent layer of the fluorescent standard strip in a case where various problems may occur, a maximum range of fluorescence that is measurable by a sensor of a device, and a range of fluorescence emitted to the outside from the fluorescent standard strip.

BEST MODE

Figure 1:
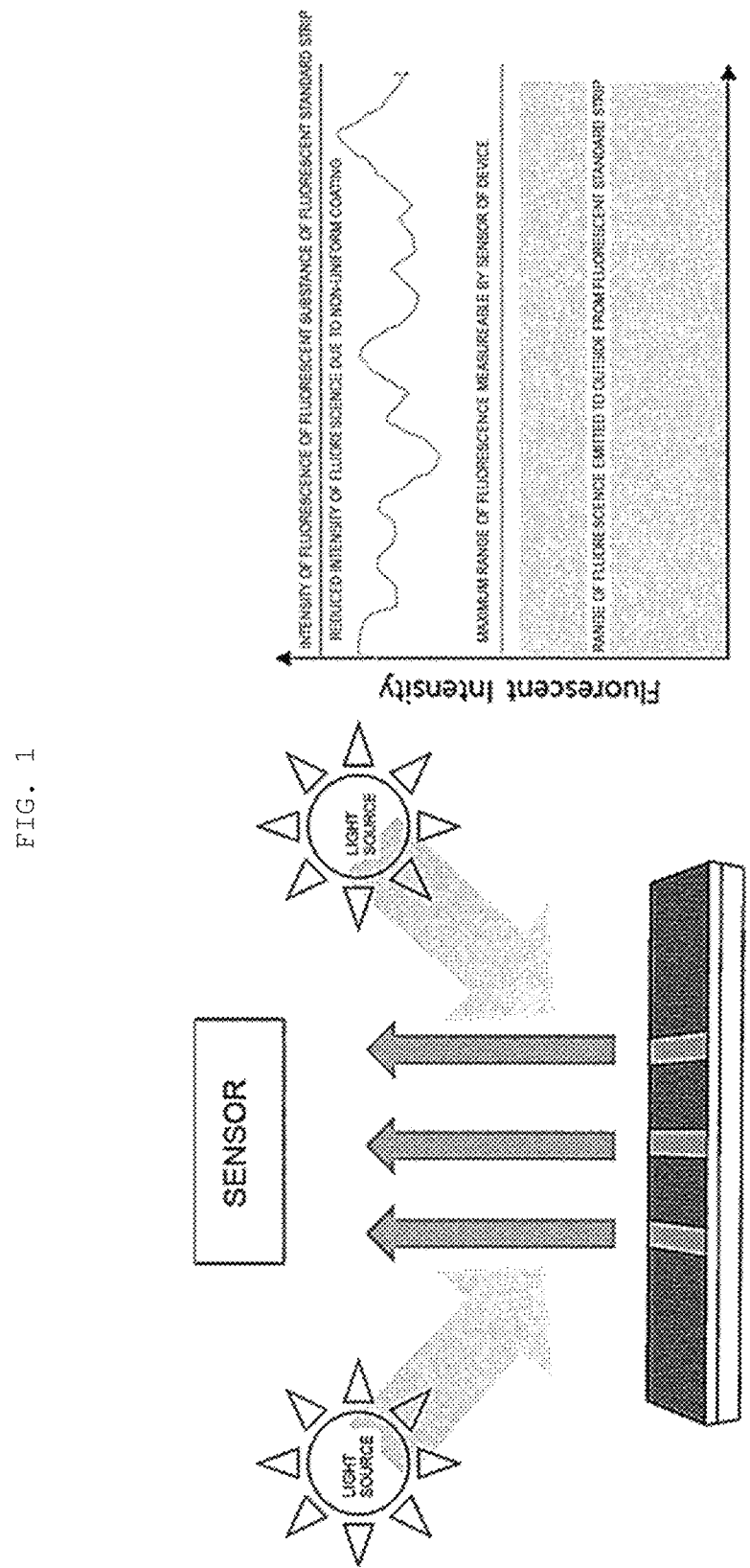

Hereinafter, a fluorescent standard strip according to the present invention will be described in detail with reference to the accompanying drawings.

The drawings exemplified below are provided by way of examples so that the spirit of the present invention can be sufficiently transferred to those skilled in the art. Therefore, the present invention is not limited to the drawings set forth below, and may be embodied in different forms, and the drawings set forth below may be exaggerated in order to clarify the spirit of the present invention.

Technical terms and scientific terms used herein have the general meaning understood by those skilled in the art to which the present invention pertains, unless otherwise defined, and a description for the known function and configuration unnecessarily obscuring the gist of the present invention will be omitted in the following description and the accompanying drawings.

The singular forms of the terms used herein can be construed as including plural forms, unless the context clearly indicates otherwise.

A unit of percentage (%) used herein with no particular mention refers to wt % unless otherwise defined.

The "layer" mentioned herein may be in the form of a plate or a plane, which may mean that a continuum of each material forms a dimension, and more preferably, the continuum of each material forms a dimension with a relatively small thickness as compared with a width and a length. Accordingly, the "layer" mentioned herein should not be construed as a two-dimensional flat plane.

The "fluorescence" mentioned herein refers to emission that occurs by absorbing a ray having a wavelength and then almost immediately radiating the absorbed ray back at a different wavelength, and disappears almost at the same time when the ray is stopped from being incident.

Recognizing a problem that an analysis device using a fluorescent substance significantly deteriorates over time in reliability as to accuracy due to a deviation in intensity of fluorescence resulting from fluorescence quenching of the fluorescent substance, the present invention is to provide a method for securing the reliability of the device by checking an inter-device deviation in intensity of fluorescence and testing the device for a linear signal characteristic for each fluorescent concentration level, and a fluorescent standard strip for the same.

To this end, the present invention provides a fluorescent standard strip in which a masking layer is stacked on a fluorescent layer including a fluorescent substance, the masking layer physically reducing an intensity of fluorescence from the fluorescent layer, such that the emitted fluorescence has an intensity equal to a required standard value or within a required standard value range for an intensity of fluorescence measured in the device, and particularly, a fluorescent standard strip capable of relatively reducing a phenomenon in which the intensity of fluorescence deteriorates over time due to the fluorescence quenching of the fluorescent substance, as compared with that in the device.

The "required standard value" mentioned herein is not a limited value because it differs depending on the size, purpose, condition, and the like of the device. Here, as a specific example in the biomedical field, it may generally be a value set according to the fluorescent substance used in a device for quantitatively analyzing a fluorescent concentration level of the fluorescent substance with respect to a target material labeled with the fluorescent substance using an antigen-antibody reaction or the like.

Hereinafter, the fluorescent standard strip according to the present invention will be described in detail.

The fluorescent standard strip according to the present invention includes a substrate; a fluorescent layer stacked on the substrate and including a fluorescent substance; and a masking layer stacked on the fluorescent layer to partially block fluorescence exposed to the outside from the fluorescent layer. In this case, an intensity of fluorescence for the fluorescent substance of the fluorescent standard strip is higher than that for a fluorescent substance of a fluorescent strip to be tested.

More specifically, by combining a constituent element that is the use of the fluorescent substance having a higher intensity of fluorescence than that used in the device and a constituent element that is a masking layer physically reducing a gap between the intensities of fluorescence, it is possible to provide a fluorescent standard strip in which the emitted fluorescence has an intensity equal to a required standard value for an intensity of fluorescence measured in the device, and particularly, a fluorescent standard strip capable of relatively minimizing a phenomenon in which the intensity of fluorescence deteriorates over time due to the fluorescence quenching of the fluorescent substance, as compared with that in the device.

Figure 6:
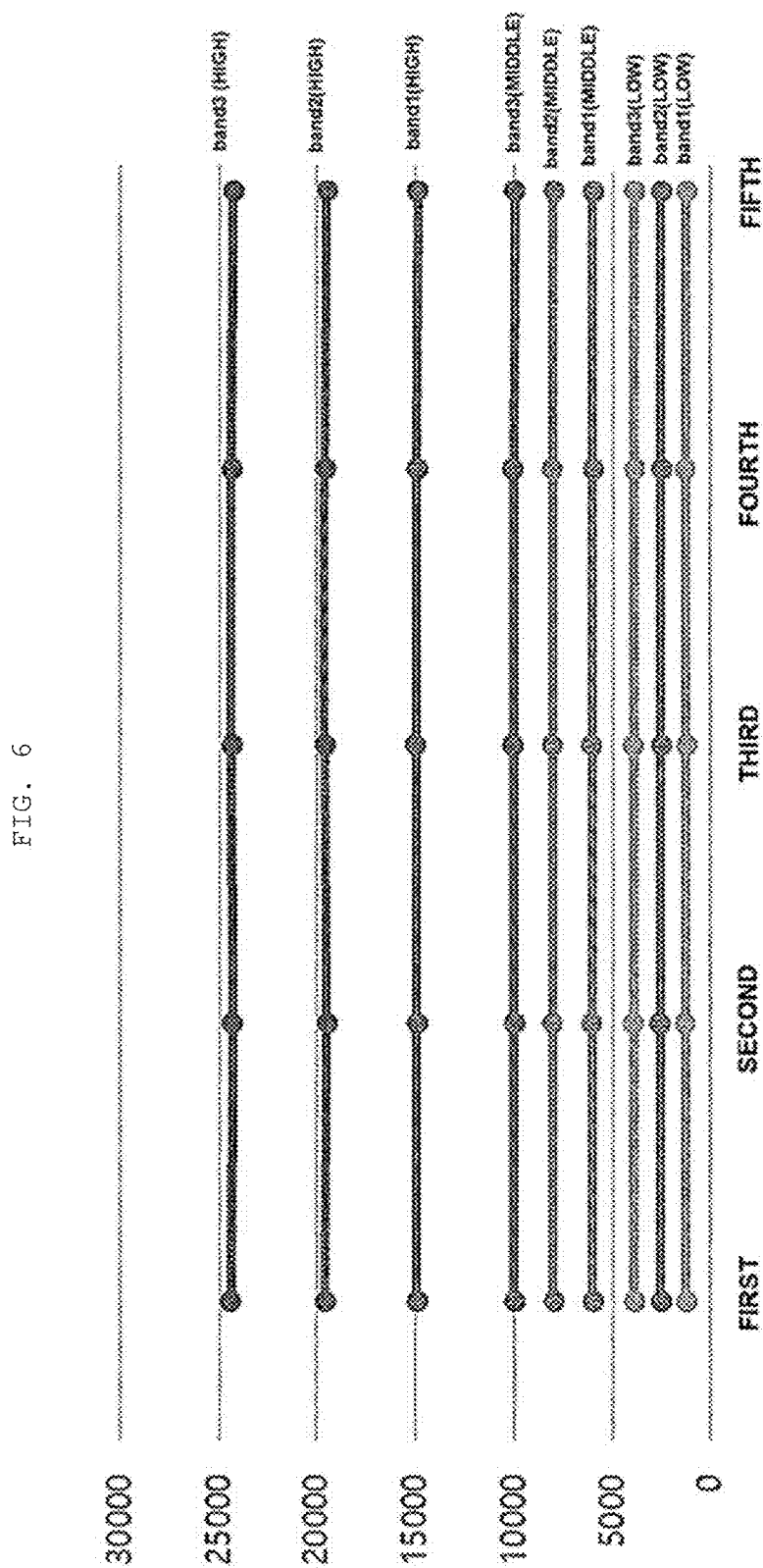
FIG. 6 is data showing that the intensity of fluorescence from the fluorescent standard strip according to the present invention when irradiated with light is constant even though the number of measurement times increases and time elapses.

The fluorescent substance generally used for analysis in the medical field is a material with very poor durability, of which an intensity of fluorescence continuously deteriorates over time due to fluorescence quenching, even though the fluorescent substance is not irradiated with artificial light, as long as the fluorescent substance is not in an environment where it is not irradiated with light at all, and the intensity of fluorescence significantly deteriorates when the fluorescent substance is irradiated with light for use. However, as illustrated in FIG. 6, with respect to the fluorescent standard strip according to an exemplary embodiment of the present invention using the foregoing material, the intensity of fluorescence during light irradiation was measured 1 to 5 times at a monthly interval, and there was no substantial deterioration in intensity of fluorescence due to the fluorescence quenching of the fluorescent substance. It can be seen specifically therefrom that the fluorescent standard strip according to an exemplary embodiment of the present invention has a significant effect.

Generally, the fluorescent substance used in a device to be tested may include any one or more selected from a cyanine-based fluorescent material, such as ROX (carboxy-X-rhodamine), HEX (hexachlorofluorescein), Cal Fluor Red 610 (C46H57F6N5O4P2), Cy2, Cy3, or Cy5, a fluorescein-based fluorescent material, such as TAMRA (5-carboxytetramethylrhodamine), rhodamine, tetramethylrhodamine, Oregon Green, R-PE, Bodipy-TMR-X, PBXL-1, Texas Red, Cryptofluor Orange, Biotin, fluorescein, R6G, HEX, EtBr, SYPRO Ruby, umbelliferone, fluorescein isothiocyanate (FITC), dichlorotriazinylamine fluorescein, dansyl chloride, quantum dots, phycoerythrin, or FAM (5-carboxy fluorescein), and an alexa fluor-based fluorescent material such as AlexaFluor32, Alexafluor488, or AlexaFluor546, but is not limited thereto as long as it is any fluorescent substance that can be used in the biomedical field.

That is, the fluorescent standard strip according to the present invention may use any type of fluorescent substance if it has a higher intensity of fluorescence than that used in the device to be tested. Preferably, as illustrated in the right graph of FIG. 1, the fluorescent standard strip may use any type of fluorescent substance if it has an intensity of fluorescence higher than the maximum range of fluorescence that is measurable by a sensor of the device to be tested, such that the intensity of fluorescence emitted to the outside after passing through the masking layer of the fluorescent standard strip falls within the required standard value range of the device. In addition, the fluorescent standard strip may use any type of fluorescent substance if it corresponds to a wavelength of the fluorescent substance required by the device, that is, if an emission wavelength of the fluorescent substance of the fluorescent standard strip falls within an emission wavelength range of the fluorescent substance used in the analysis device.

As a specific example, the fluorescent substance may be used in any type if it has a durability level and an intensity of fluorescence that are superior as compared with those of the fluorescent substance used in the above-described analysis device, while having a wavelength suitable for the fluorescent substance used in the above-described analysis device. Examples of the fluorescent substance may include LuAG (L25, L30, L40, L43, L45, L50, L60), YAG (Y50, Y52, Y54, Y56, Y58, Y60, Y62), G-YAG (GY25, GY28, GY30, GY35, GY45), or the like, which is manufactured by Dae Joo Electronic Materials, or any other one may be variously used therefor.

Figure 5:
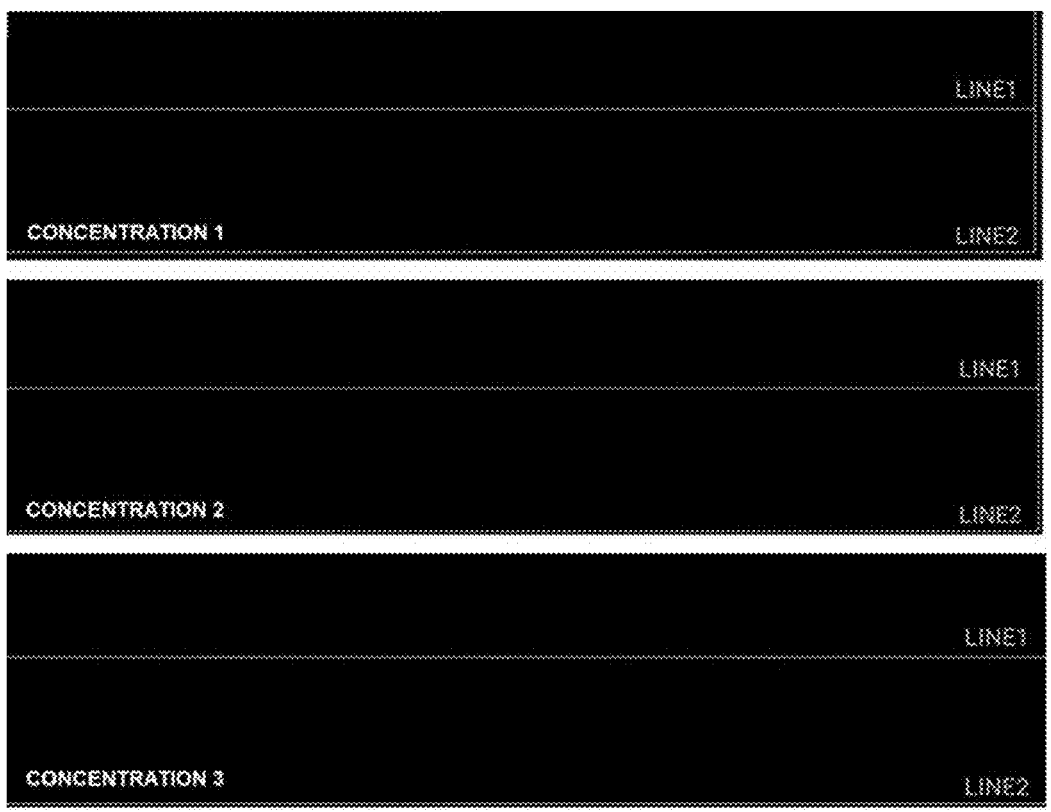
FIG. 5 is data indicating that a fluorescent concentration level may be adjusted by controlling a transmittance of fluorescence in a masking layer of the fluorescent standard strip according to the present invention.

Since the present invention uses a fluorescent substance having a higher intensity of fluorescence than that used in the device, even if the fluorescent substance is applied unevenly during the manufacturing process, the intensity of fluorescence emitted from the fluorescent layer exceeds the maximum range of fluorescence that is measurable by the sensor used in the device as illustrated in the right graph of FIG. 1, so the final fluorescent standard strip manufactured through masking control may have an intensity of fluorescence equal to the required standard value for the intensity of fluorescence measured in the device. Specifically, as illustrated in FIG. 5, as an exemplary embodiment, it can be seen that the intensity of fluorescence emitted to the outside can be precisely adjusted by adjusting a pattern of the masking layer for controlling a transmittance of fluorescence.

That is, by controlling the transmittance of fluorescence in the masking layer stacked on the fluorescent layer, the fluorescent standard strip according to the present invention may present a standard for the fluorescence of the device according to a desired concentration level of fluorescence, thereby standardizing the fluorescence of the device.

In this way, a fluorescent strip, which is a device to be tested, can be tested for reliability as to intensity of fluorescence exposed to the outside therefrom, based on the intensity of fluorescence exposed to the outside from the fluorescent standard strip. In this case, in the fluorescent standard strip according to the present invention, when the fluorescent layer is irradiated with light, the fluorescence emitted from the fluorescent layer is irradiated in a direction toward the masking layer, and the fluorescence incident from the fluorescent layer to the masking layer is transmitted through the masking layer, which serves to partially block the light, such that the intensity of the fluorescence is reduced. Therefore, the fluorescence finally emitted to the outside through the masking layer is exposed to the outside with a lower intensity, as compared to that of fluorescence initially emitted from the fluorescent layer. From this, a user may test a device to be tested for reliability as to fluorescence, based on (the intensity of) the fluorescence exposed to the outside from the fluorescent standard strip.

A method of testing a fluorescent strip for reliability using the fluorescent standard strip according to the present invention may include: a) applying the fluorescent standard strip of any one selected from claims 1 to 7 to the analysis device and measuring a fluorescence detection value, and b) determining whether the fluorescence detection value falls within the required standard value range of the analysis device. In addition, the method may further include c) comparing the fluorescence detection value and the required standard value of the analysis device for calculation and correcting an error for a deviation value of the analysis device.

Through this method, it is possible to evaluate the reliability of the device as to the fluorescence, and furthermore, it is possible to improve the reliability of the device as to the fluorescence by correcting an error caused by a deviation of a current value of the device with respect to the required standard value of the device.

Since a target device is tested for reliability as to fluorescence based on the intensity of the fluorescence exposed to the outside from the fluorescent standard strip as described above, it is preferable to avoid the fluorescence emitted from the fluorescent layer at the time of light irradiation from being exposed to the outside along a path that does not pass through the masking layer.

The fluorescent substance is a material emitting fluorescence when it is irradiated with broad-concept light such as beams or rays. Thus, when testing the device for reliability as to fluorescence using the fluorescent standard strip according to the present invention, the fluorescent standard strip has a portion for irradiating the fluorescent layer of the fluorescent standard strip with light. As a specific example, as illustrated in FIG. 1, the fluorescent layer of the fluorescent standard strip may be irradiated with light through light transmitting portions of the masking layer or through exposed side surfaces of the fluorescent layer on the respective side surface of the fluorescent standard strip, and the fluorescence emitted from the fluorescent layer may be exposed to the outside through the masking layer in a direction from the fluorescent layer to the masking layer.

The fluorescent layer may be used as what is coated with a fluorescent substance having a higher intensity of fluorescence than that used in the device to be tested or what is a combination of the fluorescent layer with the substrate, for example, a fluorescent tape or the like in which the substrate has been previously coated with the fluorescent substance. In a specific exemplary embodiment, the substrate coated with a fluorescent solution may be used, or an index manufactured by 3M, which is a fluorescent tape, may be used.

The masking layer serves to partially block the fluorescence emitted from the fluorescent layer at the time of light irradiation, thereby reducing an intensity of the fluorescence finally emitted to the outside through the masking layer of the fluorescent standard strip as compared with the actual intensity of fluorescence from the fluorescent substance of the fluorescent layer. That is, the masking layer reduces a transmission of the fluorescence incident from the fluorescent layer to the masking layer, while allowing the fluorescence to be transmitted therethrough, to control the transmission such that the intensity of fluorescence finally emitted to the outside is equal to the required standard value for the intensity of fluorescence measured in the device to be tested.

Figure 2:
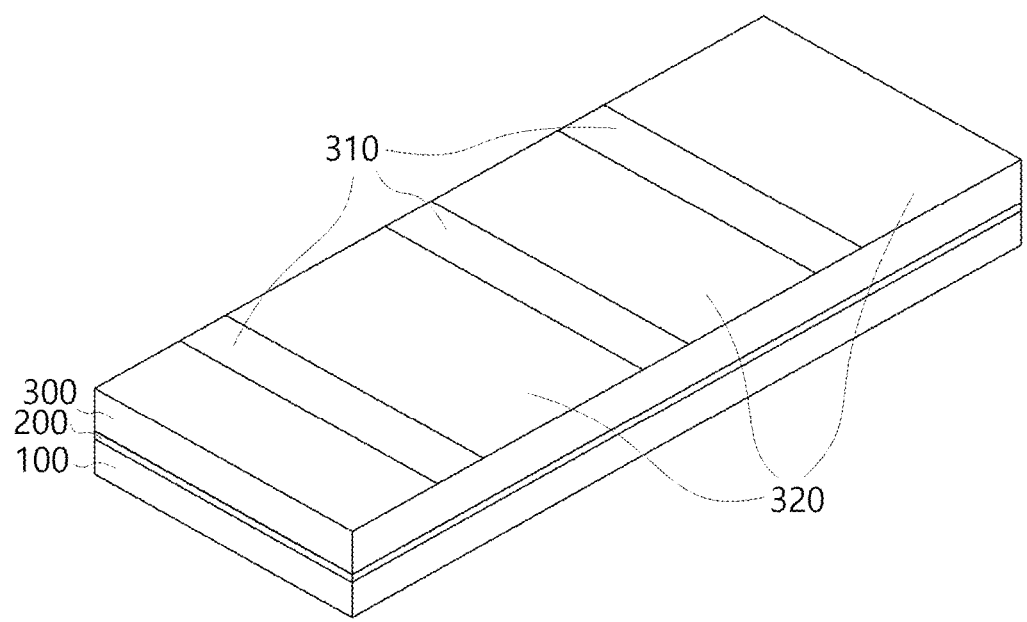
FIGS. 2 and 3 illustrate the fluorescent standard strip according to the present invention and an exploded view thereof, respectively.
Figure 3:
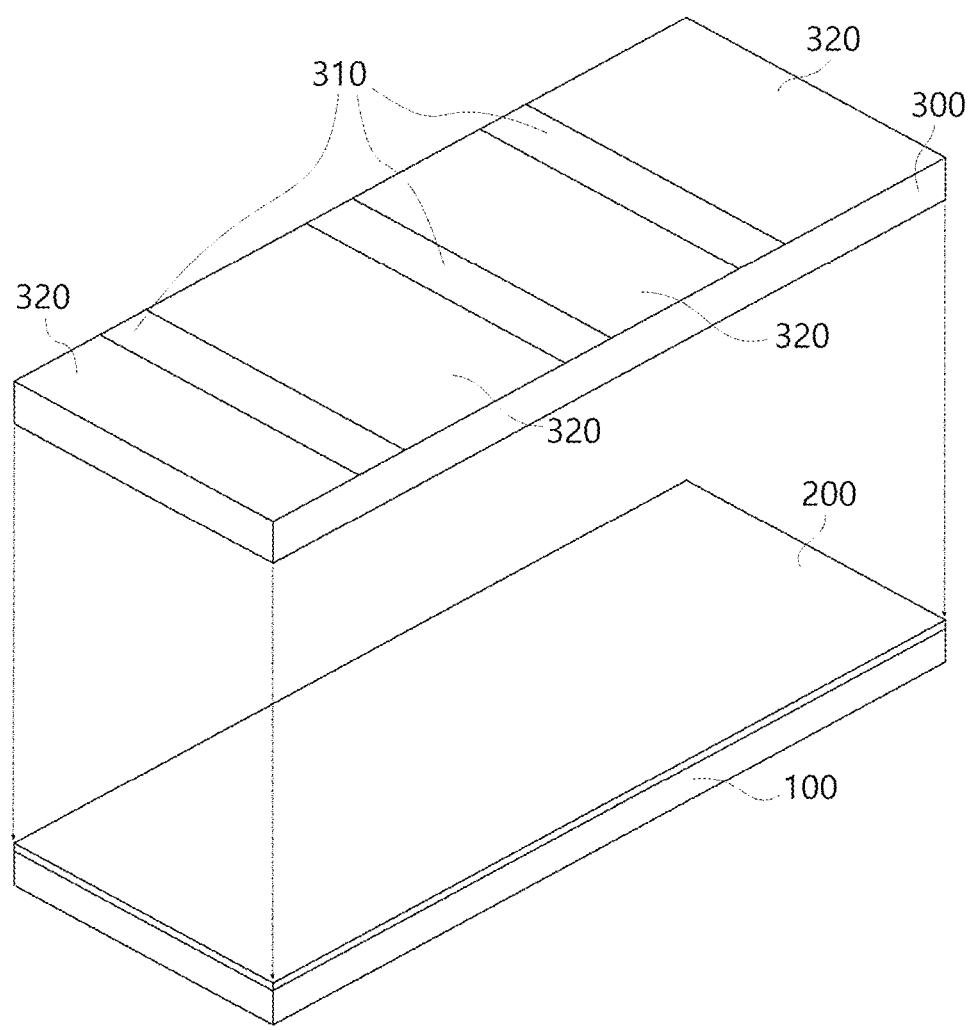

As a specific example, as illustrated in FIGS. 2 and 3, the masking layer may include a light transmitting portion having a pattern formed to control the transmission of the fluorescence incident from the fluorescent layer to the masking layer, while allowing the fluorescence to be transmitted therethrough, and a light blocking portion blocking the fluorescence. In this case, one or more light transmitting portions may be formed, with the light blocking portion being a boundary therebetween. In addition, the light transmitting portions and the light blocking portion may be formed to face the fluorescent layer, while being adjacent to the fluorescent layer, that is, in contact with or not in contact with the fluorescent layer.

The light transmitting portion of the masking layer has a pattern formed to reduce the transmittance of fluorescence incident from the fluorescent layer. In this case, the light transmitting portion having the pattern may be manufactured using a general masking method used when manufacturing a semiconductor, for which various known documents may be referred to. As a specific example, the light transmitting portion having the pattern may include a plurality of microstructures spaced apart from each other to form the pattern. Accordingly, the transmittance of fluorescence incident from the fluorescent layer may be controlled to be reduced to a required value by adjusting a pattern shape, an interval, etc. of the plurality of microstructures. More specifically, the microstructures are three-dimensionally located inside the light transmitting portion between the light transmitting portion and the fluorescent layer facing each other, so that the transmittance of the fluorescence incident from the fluorescent layer to the light transmitting portion can be reduced. The pattern shape of the microstructures may be various, such as a rectangle, a square, a hexagon, a circle, or a combination thereof, and the interval between the microstructures may be 20 to 200 µm, but the pattern shape and the interval are not limited and may be determined with reference to a technique widely known in the semiconductor masking manufacturing field because the widely known technique is used as a method of forming the masking as described above.

Figure 4:
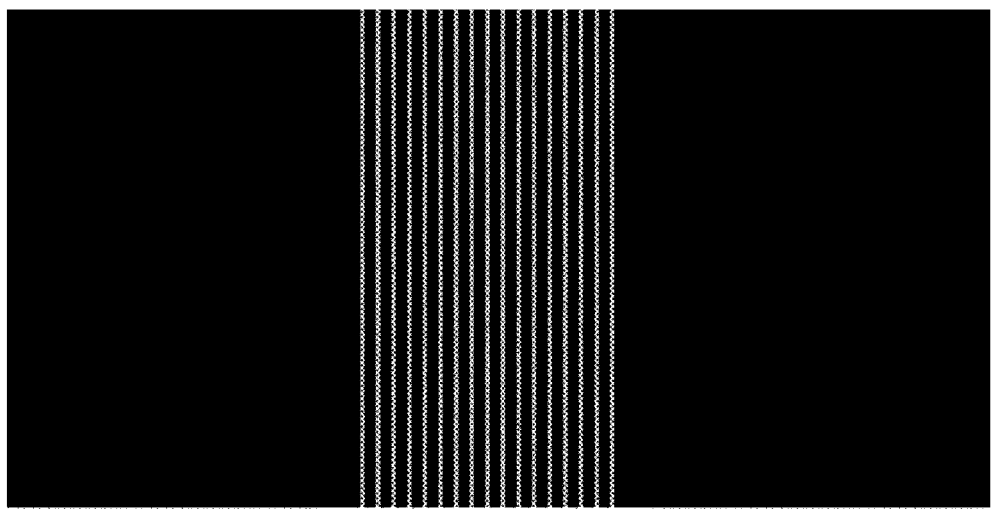
FIG. 4 illustrates an example of a line pattern of a light transmitting portion in the fluorescent standard strip according to the present invention.
Figure 4:
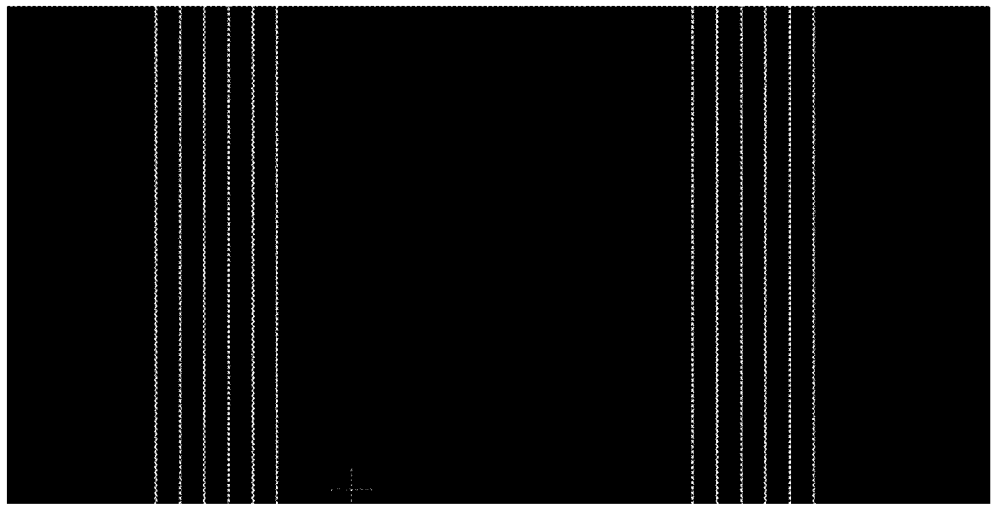

In an exemplary embodiment of the present invention, as illustrated in FIG. 4, the light transmitting portion may include a line pattern in which a plurality of lines continuing from one side to the other side of the masking layer are spaced apart from each other. In this case, the microstructures are located between the lines and the fluorescent layer, such that the transmittance of the fluorescence incident from the fluorescent layer to the light transmitting portion may be reduced. The plurality of lines may be arranged with the light blocking portion being a boundary therebetween.

In a specific exemplary embodiment of the present invention, an average thickness of the lines may be, but not particularly limited to, 20 to 200 µm, an average distance between the plurality of lines spaced apart from each other may be, but not particularly limited to, 1 to 5 mm, and the number of lines may be one, preferably two to five. However, this is only described as a preferred exemplary embodiment, and the present invention is not limited thereto.

An average thickness of the substrate, the fluorescent layer, and the masking layer is not limited as long as it is enough to achieve the above-described object so that the effect can be implemented. In an exemplary embodiment, the substrate may be 0.5 to 1.5 mm thick, the fluorescent layer may be 50 to 150 µm thick, and the masking layer may be 0.1 to 0.5 mm thick. However, this is only described as a preferred exemplary embodiment, and the present invention is not limited thereto.

As described above, the present invention may provide a fluorescent standard strip and a method of testing a fluorescent strip for reliability using the same. Furthermore, the fluorescent standard strip according to the present invention may be provided as a set together with a device to be tested. That is, the present invention may provide a fluorescent analysis device set including: the above-described fluorescent standard strip; and a fluorescent analysis device.

DESCRIPTION OF REFERENCE NUMERALS

100: substrate 200: fluorescent layer
300: masking layer 310: light transmitting portion
320: light blocking portion

The invention claimed is:

1. A fluorescent standard strip for testing a fluorescent strip used for an analysis device for reliability as to intensity of fluorescence, the fluorescent standard strip comprising:
   a substrate;
   a fluorescent layer stacked on the substrate and including a fluorescent substance; and
   a masking layer stacked on the fluorescent layer to partially block fluorescence exposed to the outside from the fluorescent layer,
   wherein an intensity of fluorescence for the fluorescent substance of the fluorescent standard strip is higher than that for a fluorescent substance of the fluorescent strip to be tested.

2. The fluorescent standard strip of claim 1, wherein the fluorescent substance of the fluorescent standard strip has an emission wavelength falling within an emission wavelength range of the fluorescent substance used in the analysis device.

3. The fluorescent standard strip of claim 1, wherein the fluorescent strip to be tested is tested for reliability as to intensity of fluorescence exposed to the outside therefrom, based on an intensity of the fluorescence exposed to the outside from the fluorescent standard strip.

4. The fluorescent standard strip of claim 1, wherein the masking layer includes:
   a light transmitting portion having a pattern formed to control a transmission of the fluorescence incident from the fluorescent layer to the masking layer, while allowing the fluorescence to be transmitted therethrough; and
   a light blocking portion blocking the fluorescence,
   wherein one or more light transmitting portions are formed, with the light blocking portion being a boundary therebetween.

5. The fluorescent standard strip of claim 4, wherein the light transmitting portion includes a plurality of microstructures spaced apart from each other to form the pattern, such that the transmission of the fluorescence incident from the fluorescent layer is reduced.

6. The fluorescent standard strip of claim 5, wherein the light transmitting portion includes a line pattern in which a plurality of lines continuing from one side to the other side of the masking layer are spaced apart from each other, and
   the microstructures are located between the lines and the fluorescent layer, such that the transmittance of the fluorescence incident from the fluorescent layer to the light transmitting portion is reduced.

7. A fluorescent analysis device set comprising:
   the fluorescent standard strip of claim 1; and
   a fluorescent analysis device.

8. A method of testing a fluorescent strip for reliability using a fluorescent standard strip, the method comprising:
   a) applying the fluorescent standard strip of claim 1 to the analysis device and measuring a fluorescence detection value; and
   b) determining whether the fluorescence detection value falls within a required standard value range of the analysis device.

9. The method of claim 8, further comprising c) comparing the fluorescence detection value and the required standard value of the analysis device for calculation and correcting an error for a deviation value of the analysis device.

* * * * *